United States Patent
Wheeler et al.

(10) Patent No.: US 9,220,358 B2
(45) Date of Patent: Dec. 29, 2015

(54) ROTATIONAL MOUNT FOR HAND-HELD ELECTRONICS

(76) Inventors: Wade Wheeler, Hillsboro, OR (US);
Donald Niderost, Hillsboro, OR (US);
Christopher Alexander, Hillsboro, OR (US); Ron Peters, Hillsboro, OR (US)

( * ) Notice: Subject to any disclaimer, the term of this patent is extended or adjusted under 35 U.S.C. 154(b) by 0 days.

(21) Appl. No.: 13/190,376

(22) Filed: Jul. 25, 2011

(65) Prior Publication Data

US 2013/0026322 A1    Jan. 31, 2013

(51) Int. Cl.
| | |
|---|---|
| *A47B 91/00* | (2006.01) |
| *A47F 7/024* | (2006.01) |
| *F16M 11/04* | (2006.01) |
| *F16M 11/10* | (2006.01) |
| *F16M 11/20* | (2006.01) |
| *F16M 13/00* | (2006.01) |
| *F16M 13/02* | (2006.01) |

(52) U.S. Cl.
CPC .............. *A47F 7/024* (2013.01); *F16M 11/041* (2013.01); *F16M 11/105* (2013.01); *F16M 11/2014* (2013.01); *F16M 11/2028* (2013.01); *F16M 13/00* (2013.01); *F16M 13/02* (2013.01); *F16M 2200/041* (2013.01); *F16M 2200/08* (2013.01); *Y10T 29/49826* (2015.01)

(58) Field of Classification Search
USPC .................... 248/551, 917–923, 176.1, 309.1; 340/539.1, 686.1, 568.1
See application file for complete search history.

(56) References Cited

U.S. PATENT DOCUMENTS

| | | | |
|---|---|---|---|
| 4,898,493 A * | 2/1990 | Blankenburg ................. 403/326 |
| 5,176,465 A * | 1/1993 | Holsted ...................... 403/379.6 |
| 7,744,404 B1 * | 6/2010 | Henson et al. ................ 439/501 |
| 2012/0217371 A1 * | 8/2012 | Abdollahzadeh et al. .... 248/551 |
| 2012/0286118 A1 * | 11/2012 | Richards ..................... 248/299.1 |

* cited by examiner

*Primary Examiner* — Amy Sterling
(74) *Attorney, Agent, or Firm* — Bruce A. Kaser

(57) ABSTRACT

The invention is a rotational mount for use in displaying hand-held consumer electronics in a retail environment. The rotational mount allows the hand-held to freely pivot in rotation on the display. The mount may automatically return to an initial orientation.

2 Claims, 9 Drawing Sheets

ROTATIONAL MOUNT FOR HAND-HELD ELECTRONICS

TECHNICAL FIELD

The invention disclosed here relates to displays for merchandise, in general, and hand-held consumer electronic devices, in particular. More specifically, the invention relates to a display that allows hand-helds to be turned or rotated on the display and then return to an initial or original rotational orientation when released.

BACKGROUND OF THE INVENTION

It is common to display various types of electronic devices (cell phones, cameras, PDAs, tablet devices, etc.) in a secured fashion on a countertop in a store. Often times, the device is mounted to a display post, sometimes with a tether or other mechanical means that secures the device to the post. Depending on the specific device, sometimes the device is mounted to a post in a way that allows the device to be turned or rotated without lifting it. Various kinds of security sensors are commonly used on the display.

Smart phones and tablet devices have rectangular display screens that adjust the orientation of the content on the screen so that it remains readable to the eye of the user, even though the device (and its screen) is rotated between portrait and landscape orientations. This is a common feature of tablet devices like the iPad (Registered™ of Apple).

Because these products are becoming more common in the consumer hand-held market, consumers in the store want to manipulate the product to evaluate the display screen—which includes rotating the product at the point of display. For this reason, it is not uncommon to provide display mounts that allow product rotation in some fashion.

However, allowing product rotation raises a set of mechanical and electrical issues relating to these mounts. As an example, if a typical tethered mount is simply turned or twisted in place, it creates undesirable stresses on the tether, particularly, if the tether consists of conductor wires for delivering power to the device or security sensors.

The retailer also wants a usable display that manages the appearance of all the displayed units in an attractive way. In other words, the retailer does not want a series of tablet devices displayed haphazardly, but would prefer all of the devices to be neatly aligned when a potential purchaser is not examining them. Sales people do not always have the time to revisit the display on an ongoing basis to realign the products after a consumer passes the display.

The invention described here is an improved rotational mount that is particularly well-suited for the display of consumer hand-held devices in the retail environment.

SUMMARY OF THE INVENTION

The invention is a rotational mount for use in a retail display environment. The rotational mount includes a mounting member that supports a hand-held device. The mounting member is pivotable in rotation or may freely turn about an axis ("pivoting axis").

The mounting member supports the hand-held at an angle relative to a vertical axis—the vertical axis being different from the pivoting axis. In other words, the pivoting axis is at an angle from the vertical. In this version, the rotational mount may further include a weight, carried by the mounting member, that is off-set relative to the pivoting axis. Off-setting the weight in this manner allows the weight to create a gravitational bias that normally swings the mounting member to the same initial display position—corresponding to the lowest vertical height of the weight's-center of mass. In other words, the weight orbits the pivoting axis within an angled plane and has a vertical "high" point and a corresponding vertical "low" point, depending on the position of the weight along the orbital path. The force of gravity naturally pulls the weight to the lowest point on the path and thus defines a natural, initial orientation for the hand-held on display. When a consumer turns the hand-held to review different landscape and portrait orientations on the hand-held's display screen, the weight automatically returns the hand-held to its initial position when the consumer releases the hand-held.

There may be other ways of creating an auto-return function that have not yet been devised. However, with hand-held devices that automatically rotate images as the device is rotated between landscape and portrait positions, or vice versa, it is generally wanted to have the device automatically return to an optimum display orientation after a user (a consumer evaluating the product) rotates and releases the product on the mount.

Other features of the invention relate to the body portion of the mounting member. The mounting member may have an upper body portion and a lower cylindrical body portion. The upper body portion carries an electronics board for providing hand-held power and security functions. Also received within the lower cylindrical portion is an electrical swivel that enables the transmission of power to the hand-held as a pass-through relative to the rotational mount.

Placing the electrical swivel in the body portion of the mounting member allows free rotation above the surface of a display counter without twisting or putting electrical conductors in torsion. In other words, the device is powered or can charge at all times while it is on the mount and being rotated.

Preferably, the rotational mount includes an adaptor member that is releasably connected to the mounting member. The adaptor member provides a platform for supporting or mounting the hand-held to the mounting member. Moreover, in preferred form, the adaptor member provides a platform for carrying the weight in the off-set manner described above.

And finally, the lower cylindrical portion has a smooth outer cylindrical surface that fits into a complementary socket in a base member, to thereby create the needed pivoting structure.

In another variation, detent springs may be included to releasably hold the mounting member at different rotational positions. This is an option that may be provided for specific retailers. The detent springs may also be used independently of any auto-return functions. In other words, some retailers may want a simpler mount that can rotate freely and hold specific rotational positions until actively moved to other rotational positions.

Other features of the invention will become more apparent upon review of the following description which is to be taken in conjunction with the drawings.

BRIEF DESCRIPTION OF THE DRAWINGS

In the drawings, like reference numbers and letters refer to like parts throughout the various views, and wherein.

DETAILED DESCRIPTION

Figure 1:
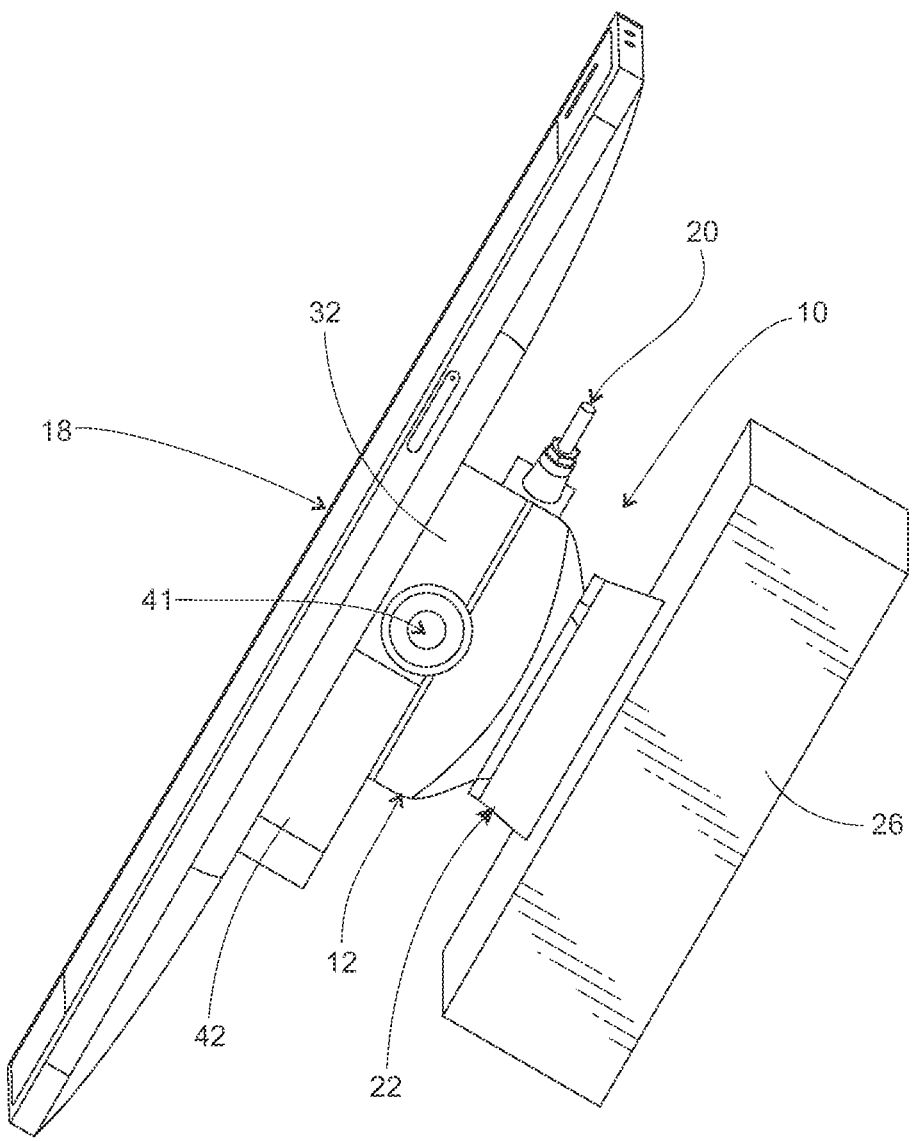
FIG. 1 is a pictorial view of a rotational mount constructed in accordance with a preferred embodiment of the invention.

Referring now to the drawings, and first to FIG. 1, shown generally at 10 is a rotational mount constructed in accordance with a preferred embodiment of the invention. The rotational mount 10 includes an upper body portion, indicated generally by arrow 12, and a lower body portion that is indicated generally at 14 (see FIG. 9). The lower body portion 14 is generally cylindrical in shape and is sometimes referred to herein as the "lower cylindrical portion 14." The upper and lower body portions 12, 14 may be manufactured in many different ways but, preferably, they are molded as an integrated piece during the fabrication process.

Figure 10:
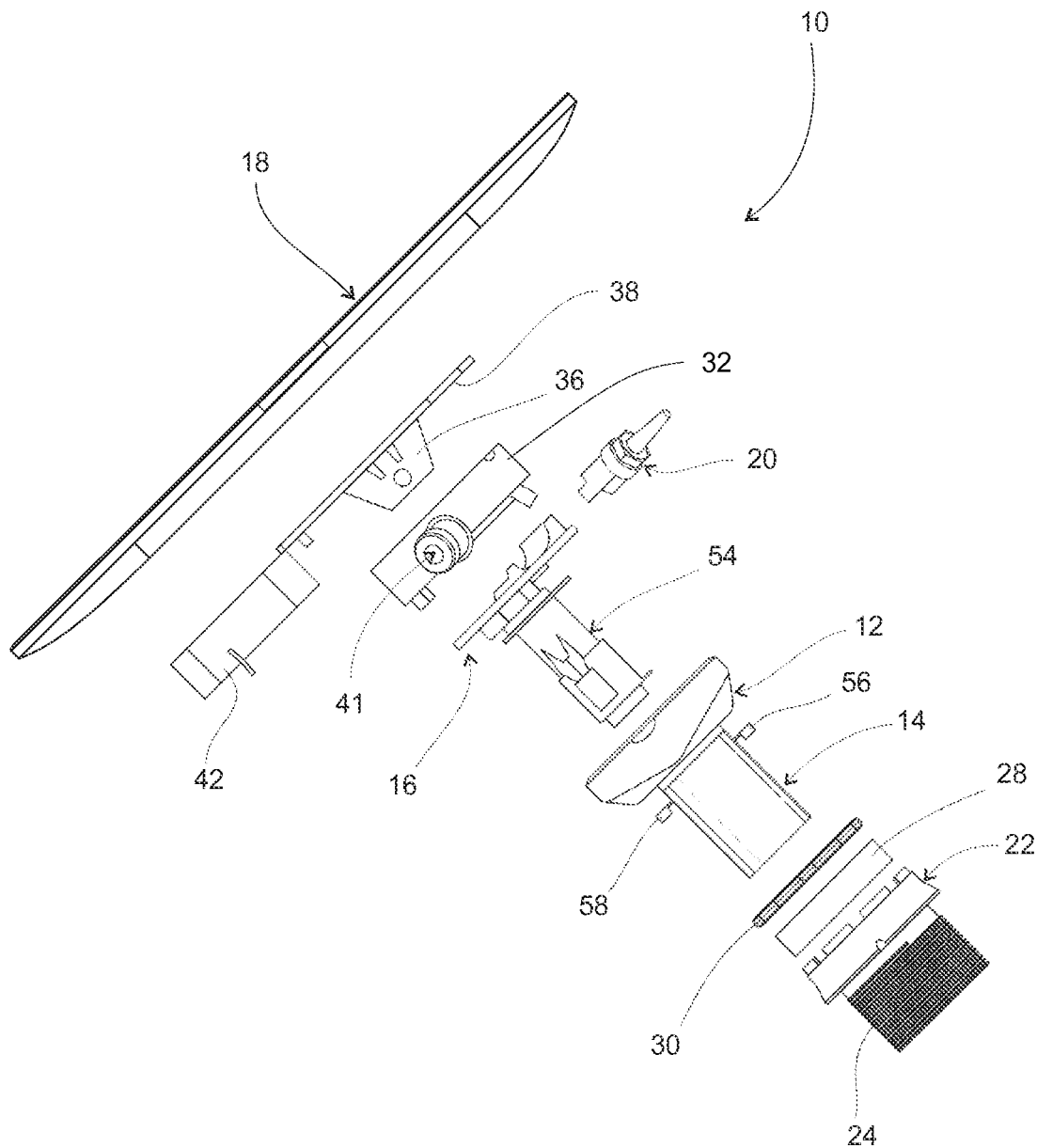
FIG. 10 is an exploded view of the rotational mount.

The upper body portion 12 carries an electronics control board ("ECB"), indicated generally at 16 in exploded view FIG. 10. The ECB 16 typically carries the electronics necessary to supply power or security functions to a hand-held device (indicated generally at 18 in the various drawing figures). The functions of the ECB 16 are generally known in the industry and need not be further described here. There is often a connector jack for a cable connection (typically a power cable) between the mounting member 10 and the hand-held 18. This connection is generally illustrated at 20 in the various figures.

The usefulness of the invention relates to the disclosed mechanical means for rotationally mounting the hand-held 18 to a consumer display stand in a retail environment—which is typically a big-box retailer. With this in mind, the mechanical components of the rotational mount 10 will now be described.

Figure 6:
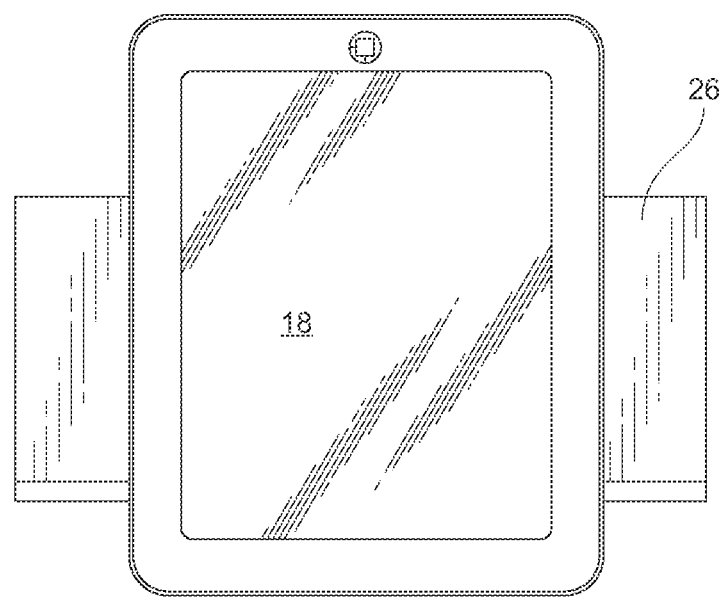
FIG. 6 is a top view of a tablet device supported by the rotational mount.
Figure 7:
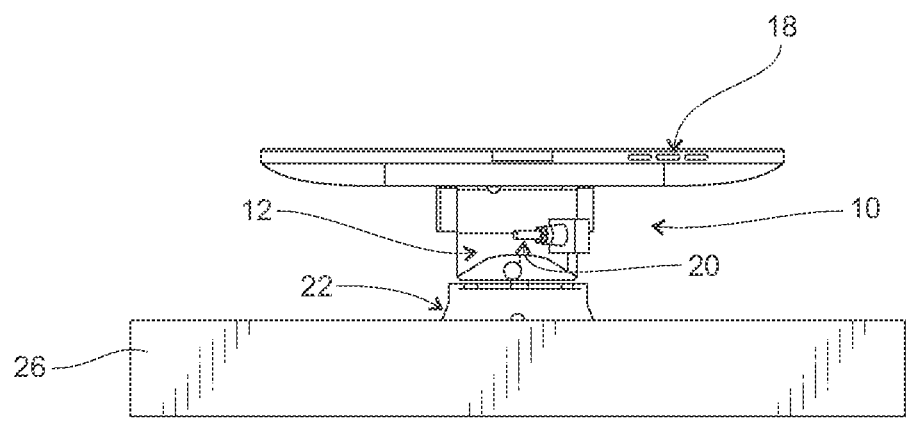
FIG. 7 is a view like FIG. 1.

Referring now to the exploded view in FIG. 10, a portion of the overall rotational mount assembly consists of a base member or base fitting, indicated generally at 22. This fitting 22 has a threaded portion 24 that allows it to be fixably mounted to a conventional countertop surface (indicated at 26 in FIGS. 6, 7 and 8). The specific way of connecting the base member to the countertop 26 can take different forms. However, the base member 22 otherwise provides a hollow cylinder for receiving the cylindrical base portion 14 of the rotational mount 10. It also carries a bearing member 28 and detent member 30 that will be further described later.

Figure 2:
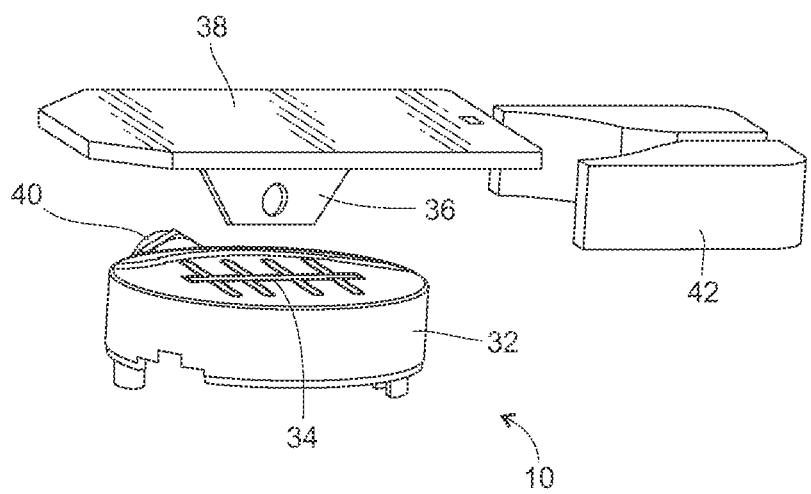
FIG. 2 is a pictorial view of a mounting member portion of the rotational mount that carries an off-plane weight for rotating the mount (and hand-held) into a normal position via the force of gravity.
Figure 9:
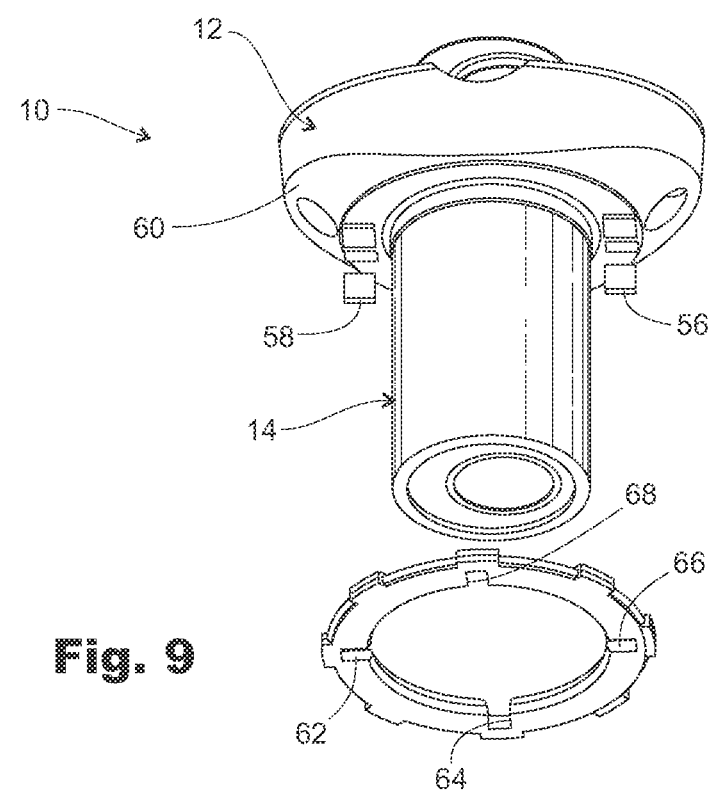
FIG. 9 is a view of the under-side of the rotational mount and illustrates detent springs for adjusting the rotational position of the mounting member, as an option.
Figure 12:
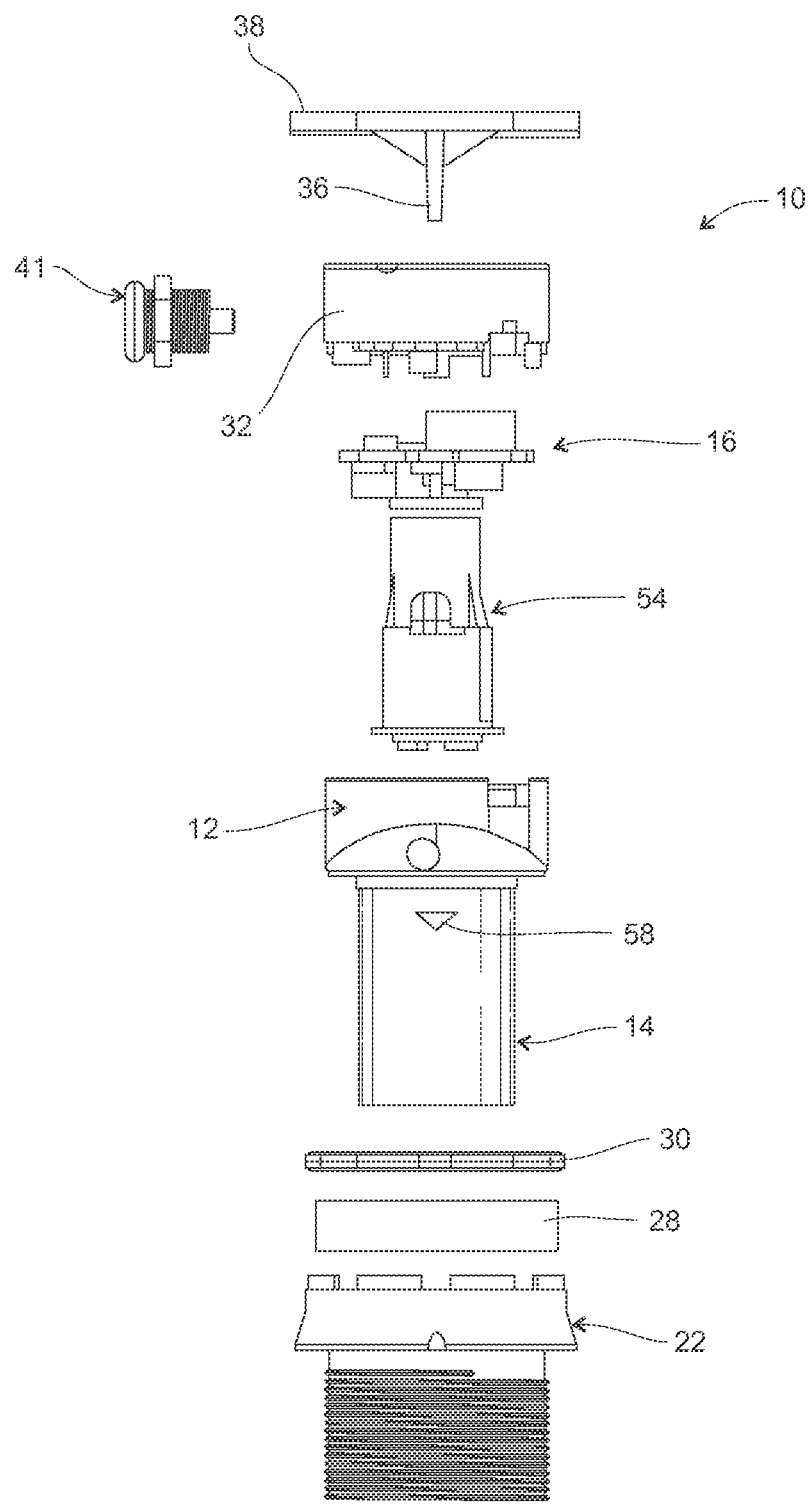
FIG. 12 is an exploded side view.
Figure 13:
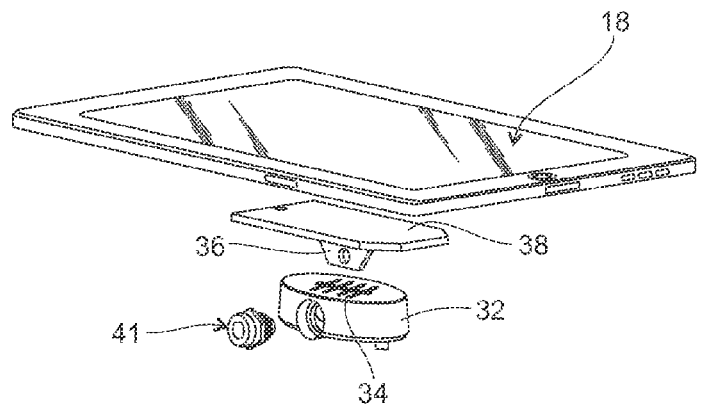
FIG. 13 is an exploded view of the upper part or cap piece of the rotational mount.

Directing attention now to FIGS. 2 and 9, the upper body 12 of the rotational mount 10 includes a cap piece 32 that is included as top-most part of the upper body portion 12. The cap piece 32 covers the ECB 16. The cap piece 32 also has a slotted surface 34 that is shaped to receive a flange 36 of an adaptor member or adaptor plate 38. The flange 36 is held in position in cap piece 32 by a lock/release screw 40 or similar means. Referring to FIGS. 12 and 13, for example, the preferred form is a key lock 41 that allows both security and easy connection or disconnection of adaptor plate 38 from cap piece 32.

Figure 3:
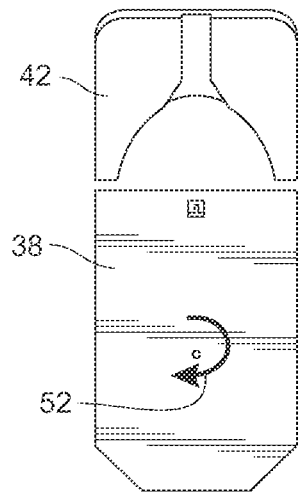
FIG. 3 is a top view of FIG. 2.
Figure 4:
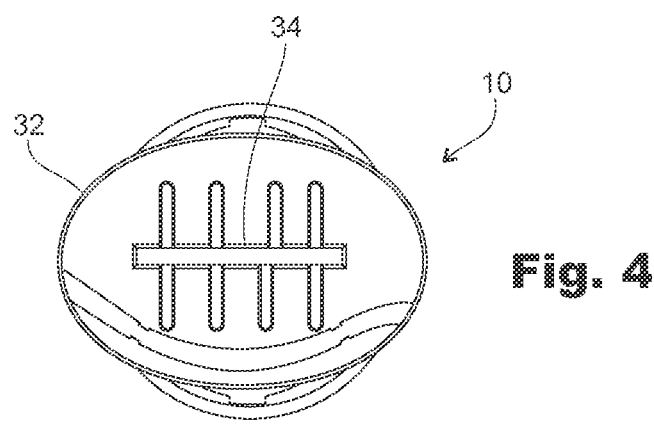
FIG. 4 is a view similar to FIG. 3, but shows the weight removed.
Figure 11:
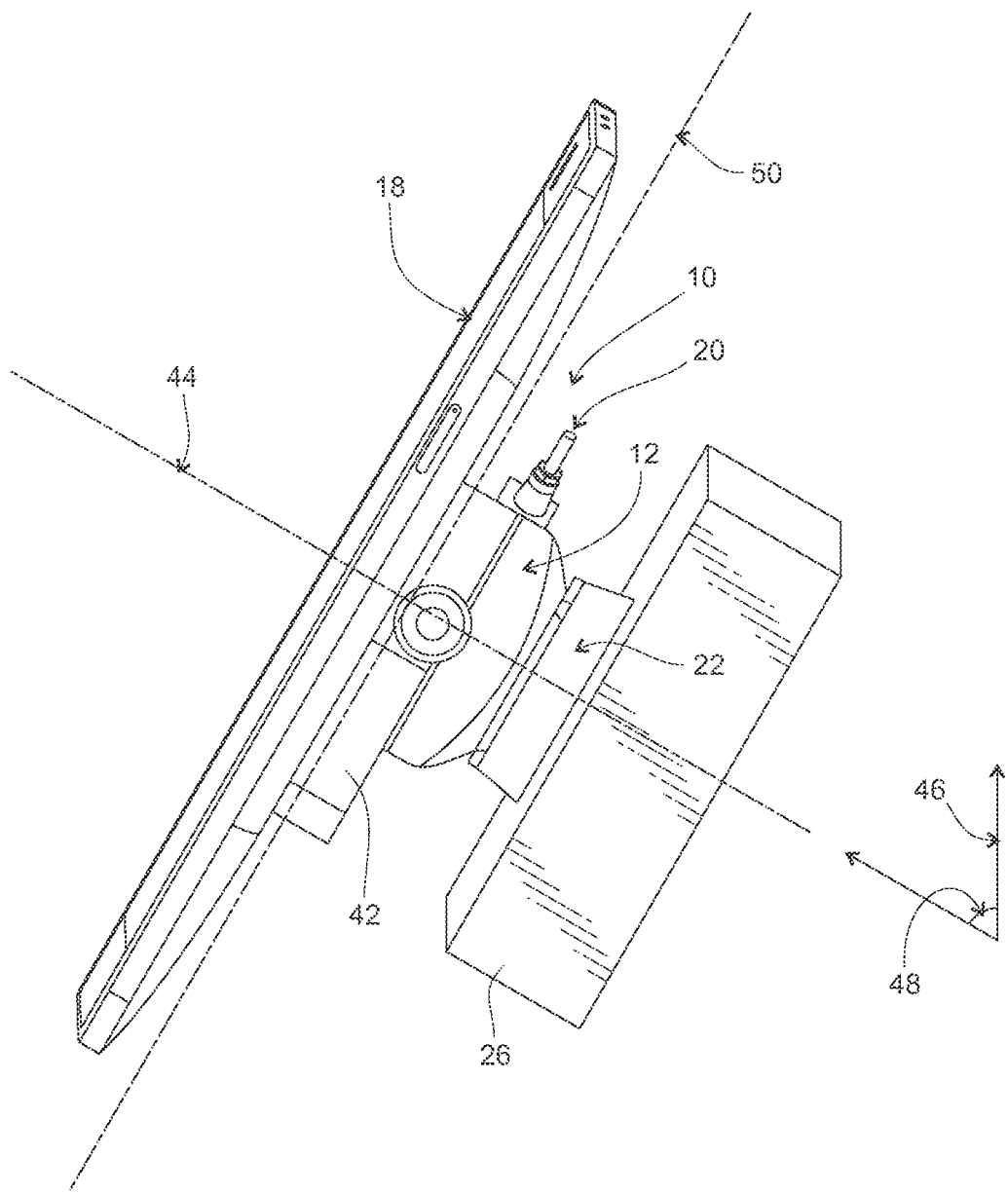
FIG. 11 is a view like FIG. 1, but shows the axial and planar alignment of the display.

The adaptor plate 38 has two functions. First, it provides a quick-connect, support surface for mounting the hand-held 18 to the rotational mount assembly 10. Second, it provides a support platform for a weight 42, in those versions where a weight is used. Referring to FIG. 3, for example, the weight 42 is connected to adaptor plate 38 on one side thereof. As shown in FIG. 11, this creates a mass that is off-set relative to an axis, as further described below.

Referring now to FIG. 12, the lower cylindrical portion 14 is free to rotate within the cylindrical opening defined by base member 22. Freedom of rotation is assisted by the bearing member 28 previously described. The rotational mount 10 is mounted so that its axis of symmetry (see arrow 44 in FIG. 11) is angled relative to the vertical. In FIG. 11, arrow 46 indicates a vertical axis while arrow 48 indicates the angle between the axis of symmetry 44 and the vertical axis 46.

The axis of symmetry 44 is a pivoting axis about which the upper and lower body portions 12, 14 of the mounting member turn (corresponding to rotation of the hand-held 18 on the display).

As is apparent from FIG. 11, the adaptor plate 38 defines the angle of a mounting plane for the hand-held 18 (indicated generally at 50) that is normal to the pivoting axis 44. It is to be appreciated that the plane may occur at different normal locations along axis 44—which only means it relates to the degree of tilt of the rotational mount 10. However, the angle of the plane 50 defines a planar orbit for the weight 42 and off-sets the weight 42 a certain distance from the pivoting axis. Therefore, when the hand-held 18 is turned or rotated by the consumer, the weight 42 also turns about the axis 44 to a different rotational position (see arrow 52 in FIG. 3). When the hand-held 18 is released by the consumer, the elevated position of the weight 42 relative to what is shown in FIG. 11, for example, will cause it to return to the original display position shown in FIGS. 1 and 11 via the force of gravity that is naturally exerted on the weight.

As a person skilled in the art will understand, this gravitational effect will vary depending on the mounting angle 48 that is selected. As the mounting angle 48 approaches zero (in other words, the pivoting axis 44 approaches the vertical, then the gravitational forces become inadequate to rotationally return the display to its initial position). As the angle 48 approaches ninety degrees (90°), the force of gravity is optimized.

The rotational bias of the mount 10 may be accomplished by other means as an example, with respect to a tablet device, it may be mounted to the adaptor plate 38 so that the center of gravity is offset sufficiently from the pivoting axis 44 so that just the unbalanced weight of the device causes it to return to the original position.

Hand-helds need a power supply when they are on display to consumers. Displays of this type also need a power supply to operate certain security features or functions (e.g., security sensors on the mounting member or security sensors attached to the hand-held itself). Therefore, in order to provide "pass through" power through the rotational mount 10, an electrical swivel, of the type illustrated in FIG. 5, is received within the lower cylindrical portion 14 of the mounting member.

Figure 5:
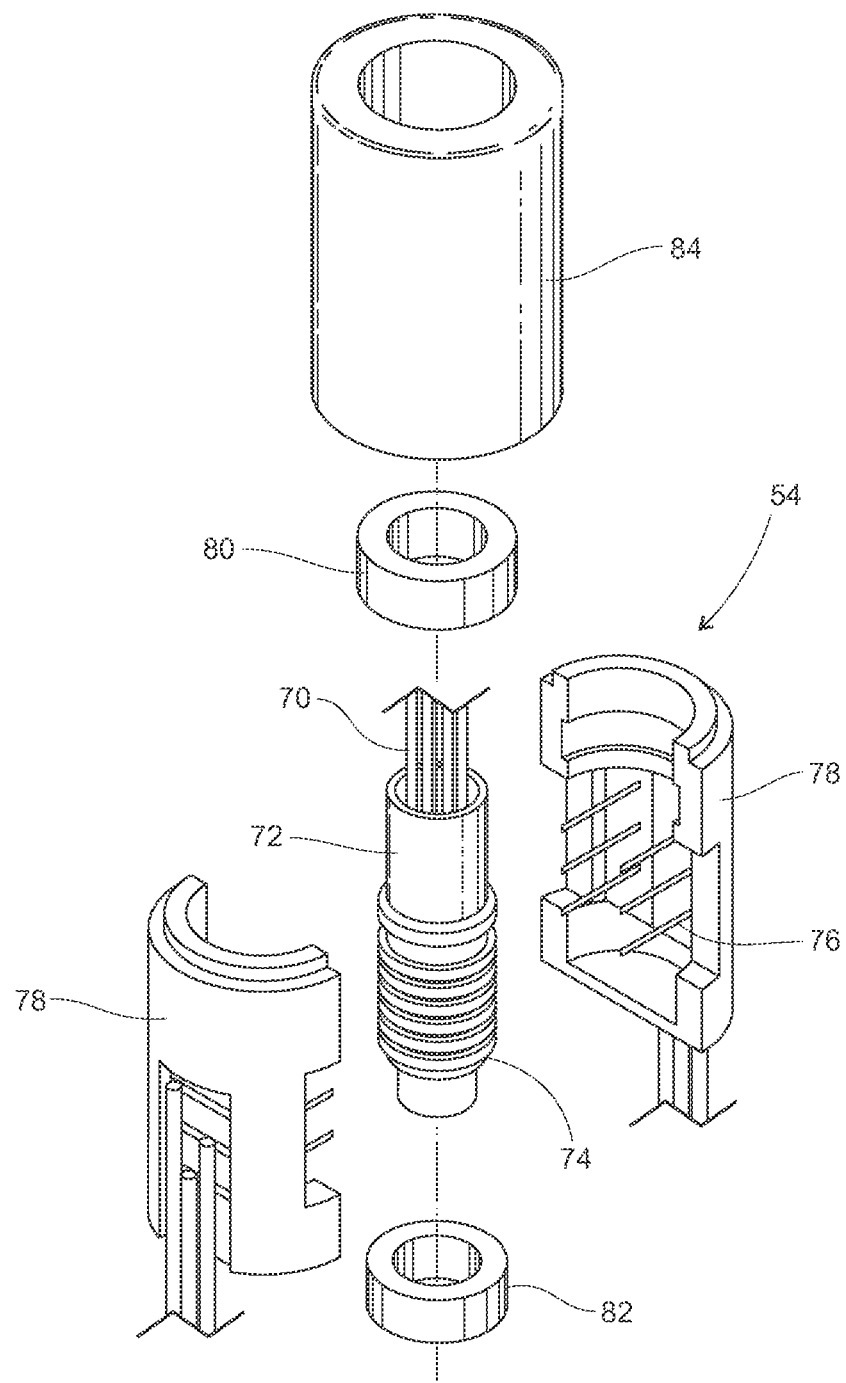
FIG. 5 is an exploded view of a swivel mechanism for conveying power through the rotational mount to a hand-held.

The swivel 54 illustrated in FIG. 5 is similar to the one illustrated and described in U.S. Pat. No. 7,744,404, which is incorporated here by reference. The swivel 54 is adapted to provide a means for utilizing a multiple number of wires to provide power into and through the rotational mount 10. The wires are indicated at item 70. Each wire may extend into a cylindrical housing 72 and terminates in a ring contact 74. The ring contact 74 is in sliding rotational contact with a similar commutator-type contact 76 in an outer cylinder 78 (shown in halves in FIG. 5). The inner cylinder 72 rotates within the outer cylinder 78 via two bearings 80, 82. The entire assembly of parts is contained within an outer cylindrical housing 84 which may be received within the lower portion 14 of rotational mount 10.

Figure 8:
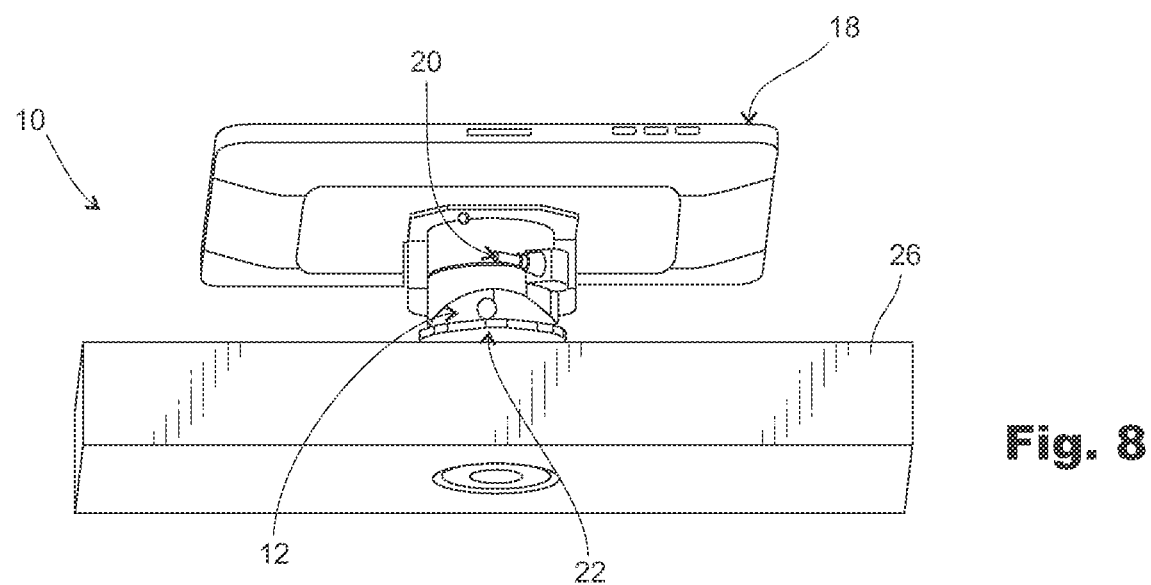
FIG. 8 is a view like FIG. 7, but from a different angle of view.

The advantage to the above design is that it puts the swivel inside the body that makes up the mount. Referring to FIG. 8, for example, the mount 10 can be attached to a countertop surface without significant structure protruding below into the space below the countertop (see, generally arrow 85).

As an alternative to the auto-return function provided by the weight and tilt function described above, it may be desirable to provide an alternative way to hold the mounting member 12, 14 in different rotational positions. If desired, a plurality of spring members 56, 58 may be attached to the underside 60 of the upper mounting member (see FIG. 9). These spring members 56, 58 may releasably catch slots 62, 64, 66, 68 distributed around the detent member 30.

Figure 14:
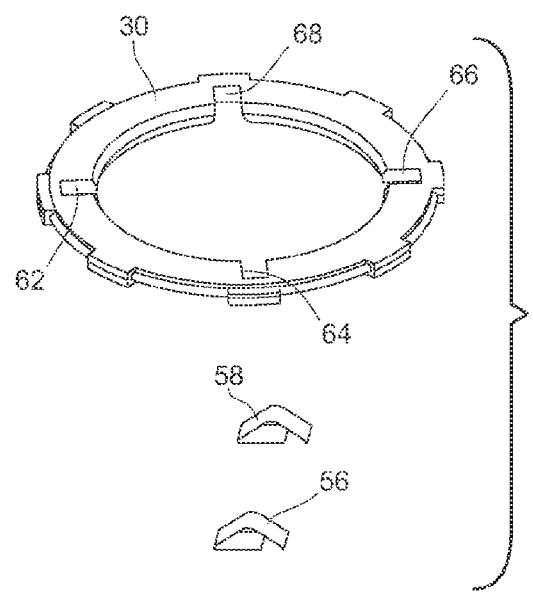
FIG. 14 is an exploded pictorial view of the detent mechanism.
Figure 15:
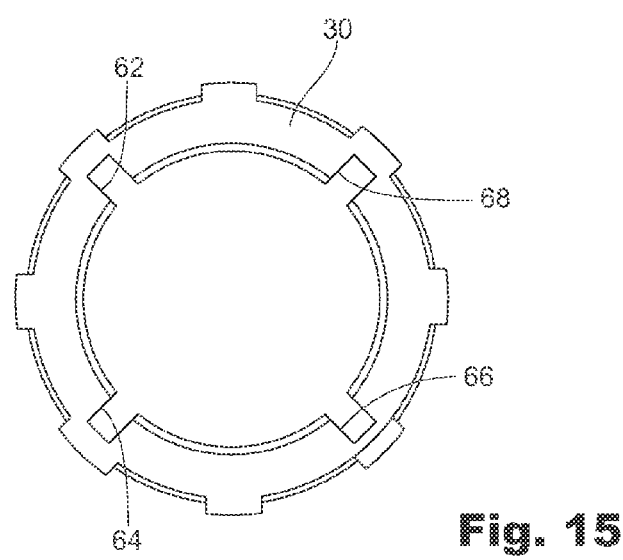
FIG. 15 is a bottom view of a detent member.

FIG. 14 illustrates how the spring members 56, 58 releasably catch different slots in detent member 30, corresponding to position of rotation. FIG. 15 shows the generally annular shape of the member 30. Depending on the number and orientation of slots 62, 64, 66, 68, the detent member 30 provides a means for selecting and holding orientation. It is to be appreciated that the detent member 30 could be used with or without any auto-return function and simply allow the user to rotate the hand-held to discrete positions, and hold the position, until rotated again.

An advantage of the rotational mount 10 described above relates to the freely-swiveling nature of the product 10. The above design allows free rotation of a displayed product around 360° (three hundred sixty degrees) of rotation or more. For tablet devices, in particular, this design permits a potential purchaser to rotate the device 18 to either the landscape or portrait positions, as desired.

The adaptor plate 38 not only provides a surface or support platform for the hand-held 18, but also provides the quick-release feature via lock 41 (see FIG. 13) previously described. More specifically, the adaptor plate 38 can be sold to a user as a separate component for mounting hand-helds. The lock 41 enables one hand-held/adaptor plate 38 unit to be swapped quickly on and off the rotational mounting structure. With respect to merchandising uses, this feature provides the ability to have a device securely displayed and powered on the mount 10. When it is desired to view the device (i.e., a shopper), the lock 41 can be used to quickly remove the device 10 and plate 38 for viewing and using the hand-held off the mount. Afterward, the device can be replaced quickly.

To summarize, while the invention described here is well-suited for use in the retail environment, it may be used in other locations where it is desirable to display tablet devices or other kinds of similar devices (e.g., flat-screen displays, etc.). In other words, schools, libraries that provide internet access, warehouses, hospitals, or law enforcement agencies are examples of possible users of the invention described here. Unless the claims specifically limit scope of the patent right, it is not intended to limit the scope of the patent to retail locations. Moreover, the swivel structure illustrated in FIG. 5 is coaxial with, or coaxially aligned with the mount's axis of rotation. This feature allows the mount to rotate freely but provide power to the hand-held at all points in time, whether the hand-held is at rest, or being rotated, or even disconnected from the mount (so long as the hand-held's cable remains connected). Placing the swivel above the display surface in the manner disclosed here is believed to provide significant advantages over the prior art.

The foregoing sets forth the best mode for carrying out the invention as it is presently known. It is to be understood that further enhancements and/or design changes may be made to the device described above without departing from what is considered to be the invention. Therefore, the scope of the patent right provided by this document is defined by the patent claim or claims that follow, the interpretation of which is to be made in accordance with conventional doctrines of patent claim interpretation.

What is claimed is:

1. A display for a hand-held electronics device, comprising:

a base member fixably mounted to a surface;

a mounting member for providing a hand-held display support, said mounting member being rotatably carried by said base member, said mounting member being freely pivotable in rotation about a pivoting axis for changing the display orientation of said hand-held; and an adaptor member shaped for supporting a specific hand-held on said mounting member, said adaptor member being releasably connected to said mounting member, for attaching and detaching said hand-held to and from said mounting member; and wherein said mounting member includes a planar top surface for supporting said adaptor member, with an opening in said planar top surface, and wherein said adaptor member includes a planar supporting surface for providing a resting place for said hand-held, said adaptor member further including a lower surface, and a flange member depending downwardly from said lower surface of said adaptor member, said flange member being shaped for insertion into said top surface opening of said mounting member, in a manner so that said lower surface of said adaptor member rests on said planar top surface of said mounting member; and lock means for releasably locking said flange member in place when said flange member is inserted in said opening, said lock means enabling said adaptor member to be swapped off said mounting member and replaced with another adaptor member; and wherein said mounting member includes a body portion and an electrical swivel received within said body portion, for transmitting power to the hand-held while allowing the mounting member to freely pivot.

2. The display of claim 1, including a base member, mounted to a display surface, said base member having a socket for rotationally receiving said lower cylindrical portion.

* * * * *